United States Patent [19]
LeGrange

[11] Patent Number: 5,709,552
[45] Date of Patent: Jan. 20, 1998

[54] MUSIC EDUCATION AID

[76] Inventor: Ulyesse J. LeGrange, 101 Westcott, No. 1602, Houston, Tex. 77007

[21] Appl. No.: 579,331
[22] Filed: Dec. 27, 1995
[51] Int. Cl.[6] .......................... G09B 25/00; G09B 15/02
[52] U.S. Cl. ............................. 434/404; 84/474; 84/473
[58] Field of Search ........................ 84/471, 474, 473, 84/475; 434/405, 404

[56] References Cited

U.S. PATENT DOCUMENTS

| | | | |
|---|---|---|---|
| 236,896 | 1/1881 | Knapp . | |
| 337,320 | 3/1886 | Goodwin . | |
| 359,829 | 3/1887 | Withers . | |
| 490,509 | 1/1893 | Showalter | 84/474 |
| 854,572 | 5/1907 | Fitch . | |
| 954,436 | 4/1910 | Hunter . | |
| 1,643,303 | 9/1927 | Jones . | |
| 1,804,460 | 5/1931 | Cordier . | |
| 2,542,235 | 2/1951 | Clopton | 84/474 |
| 3,472,117 | 10/1969 | Iverson . | |
| 3,572,205 | 3/1971 | Scholfield . | |
| 3,592,099 | 7/1971 | Gibby | 84/471 |
| 3,728,932 | 4/1973 | Leonard | 84/473 |
| 3,884,112 | 5/1975 | Leonard | 84/471 |
| 3,884,113 | 5/1975 | Leonard | 84/471 |
| 3,884,115 | 5/1975 | Leonard | 84/471 |
| 3,960,046 | 6/1976 | Choong . | |
| 3,969,973 | 7/1976 | Pandapas . | |
| 4,305,323 | 12/1981 | Graham | 84/474 |
| 4,881,443 | 11/1989 | Bertram | 84/473 |
| 4,961,362 | 10/1990 | Gunn . | |
| 5,173,566 | 12/1992 | Hiracka . | |
| 5,288,234 | 2/1994 | Hamzi . | |
| 5,320,020 | 6/1994 | Corley . | |
| 5,370,539 | 12/1994 | Dillard | 434/405 |

FOREIGN PATENT DOCUMENTS

| | | |
|---|---|---|
| 2254846 | 7/1975 | France . |
| 14960 | 8/1885 | United Kingdom ........... 84/474 |

OTHER PUBLICATIONS

The New Harvard Dictionary of Music, 1986, pp. 169–170.

Harvard Dictionary of Music, Second Ed., pp. 171–172.

Primary Examiner—Robert A. Hafer
Assistant Examiner—Laura Fossum
Attorney, Agent, or Firm—Pravel, Hewitt, Kimball & Krieger

[57] ABSTRACT

A rotary disk calculator and educational aid is provided to assist in learning and understanding the relation between various musical keys on an instrument according to the circle of fifths system. A base plate member or disk is divided into twelve root key positions. An intermediate or second disk or template is concentrically mounted on the base disk. The structure of the second disk is alignable at various positions with each of the root key positions on the base plate. Indicators are formed on the second disk for ease of alignment. When aligned with a particular root key position, the second disk indicates the key signature (specific sharps or flats) that a piece of music has in that key; the number of whole or half steps between notes; notes for chords used in that key; and any special relationship linking certain of the notes. A third or outer disk member concentrically mounted for rotation with the other disks represents the relations of the keys according to the ascending (clockwise) or descending (counter-clockwise) circle or spiral of fifths and provides a sight reference for alignment purposes.

16 Claims, 4 Drawing Sheets

1

MUSIC EDUCATION AID

BACKGROUND OF INVENTION

1. Field of Invention

The present invention relates to music education and training.

2. Description of Prior Art

In learning to play a musical instrument such as a piano, for example, one of the initial phases is acquiring a knowledge of the basic key structure and chord structure for the instrument. After this, students as they become more experienced musicians continue to learn and experiment with the variations and subtleties of changing these chords in various manners and blending melody and harmony. This both enhances the musician's skills and increases the pleasure and enjoyment of playing the instrument.

There is a wealth of information available about the interrelation of the various musical keys and chords which has been long well known. An example is the arrangement of the twelve musical keys in a circular, clockwise arrangement, known as the circle of fifths. This concept when expressed in words was often difficult to appreciate in a manner easily understandable for translation into the physical acts required for playing of the instrument. Another way of learning this musical interrelation of keys and chords was by rote mechanical memorization, equating and memorizing certain hand positions with each particular associated chord in the various keys. Neither approach was particularly desirable.

Various types of aids and calculators have been proposed in the past. They have ranged in structure, organization and operation from the relatively simple to the generally complex. For example, U.S. Pat. No. 3,472,117 involved a relatively simple transposition chart. It was intended to assist a user in convening or transposing a musical selection from one key to another. However, there is considerably more of interest to a musician than mere transposition of music between different keys. A number of interrelated factors and concepts of considerable help and desirability were not obtainable from transposer aids of this type.

In contrast, other more complicated indicators and calculators, such as in U.S. Pat. No. 4,961,362, were specifically designed to calculate the formation and composition of the various musical chords. Thus, various color coded bars or dashes were visible at portions of the calculator assembly as indicators of what the composition of a particular chord actually was. This structure in effect was a complex, dial-up calculator used to indicate the components of each particular chord. However, the interrelation of the various chords to each other, and the manner of accomplishing transitions between them, was not readily definable or apparent from these more complicated types of calculators and playing aids.

SUMMARY OF INVENTION

Briefly, the present invention provides a new and improved apparatus for music education and training. The apparatus includes a base member or template, usually in the form of a disk, which has musical key segments formed on it assigned to each of several music keys. According to the present invention, for clarity of definition a distinction is made between the terms keys (describing a system or scale of tones) and notes (individual tones). The base member also includes an area where are shown alternative names for individual notes. Thus, to represent the fifteen major scales used in modem music, twelve key segments are formed on the base member and are arranged in a circle of fifths rather than in chromatic or alphabetical order. The musical key segments on the base member for each music key have indicators on them designating a particular key, the number of sharps and flats in that key and the key signature for that key in written music.

The apparatus of the present invention also includes a second member which is movably mounted with respect to the base member. The second member has an alignment indicator formed on it for selective alignment with each of the key indicators of the musical key segments on the base member. The second member also has formed in it a viewing window which is comparable in size to one of the musical key segments on the base member. The second member thus permits viewing of the indicator area for a selected one of the musical key segments when the alignment indicator is aligned with the key position for that key.

The base member also has additional indicator segments formed on it which include indicators of different chords available for harmonization. The additional indicator segment also includes an indicator, spaced from the different chord indicator, of the note to be added to form an alternate chord when in the key position for a particular key. Openings are formed in the base member at positions corresponding to the spacing of the additional indicators to permit viewing of them.

Additionally, the base member has a raise (at the 7th note) half step indicator formed on it to indicate a note which is to be raised one-half step in the specified dominant 7th chord to form the diminished 7th chord.

DESCRIPTION OF PREFERRED EMBODIMENT

Figure 2A:
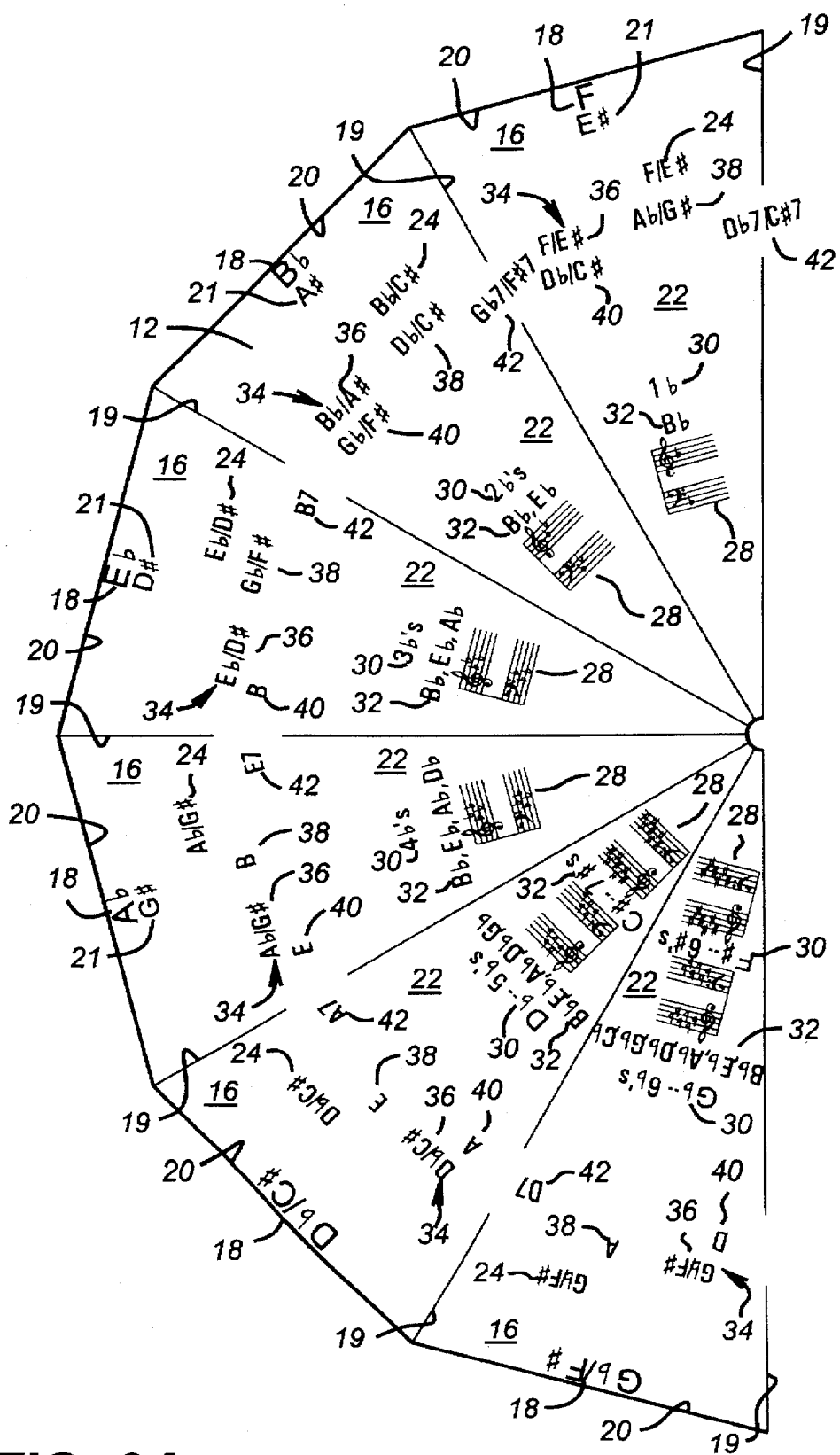
FIGS. 2A and 2B are plan views of two segments which taken together form a base disk or plate member of the apparatus of FIG. 1.
Figure 2B:
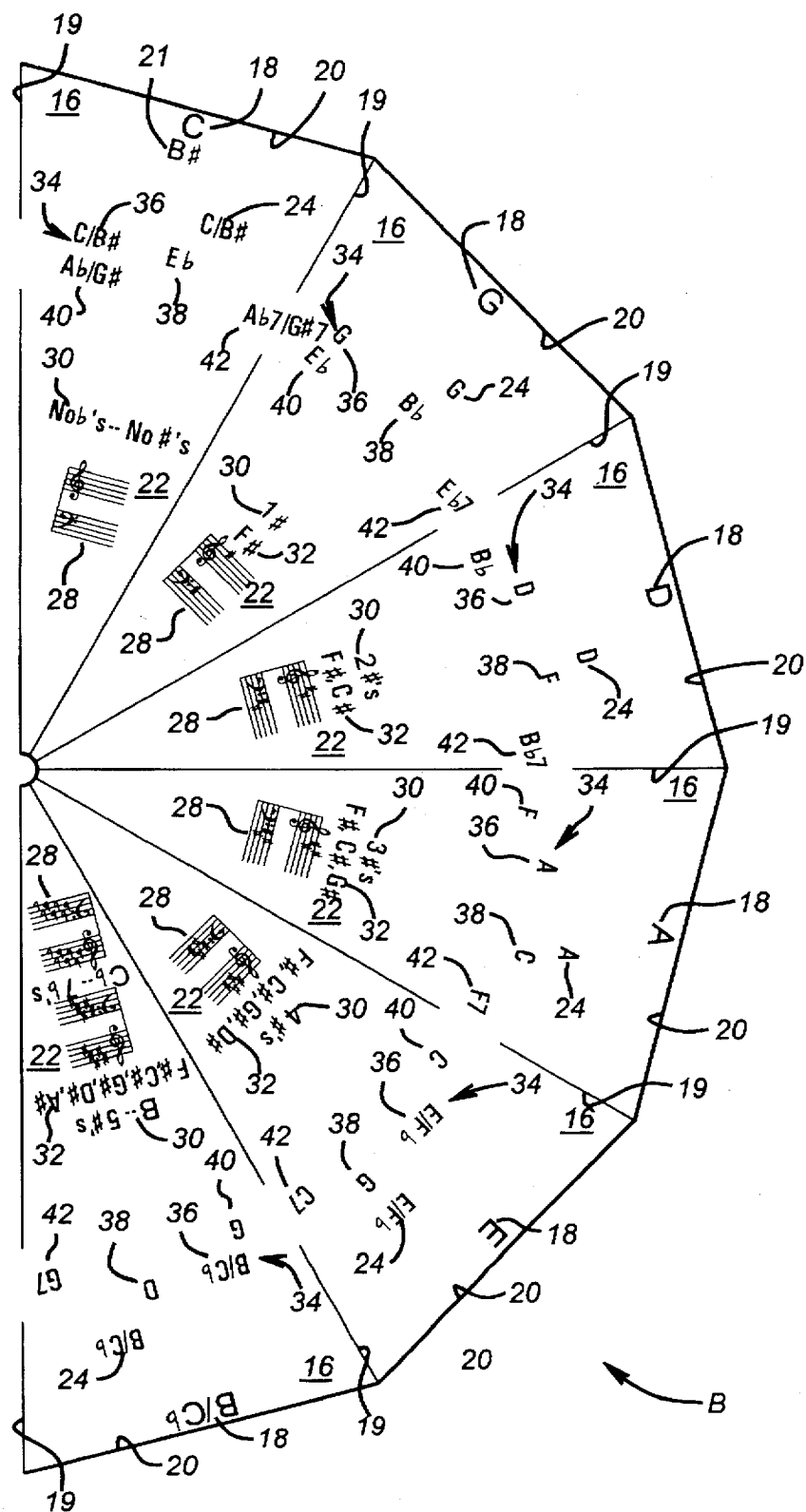
Figure 3:
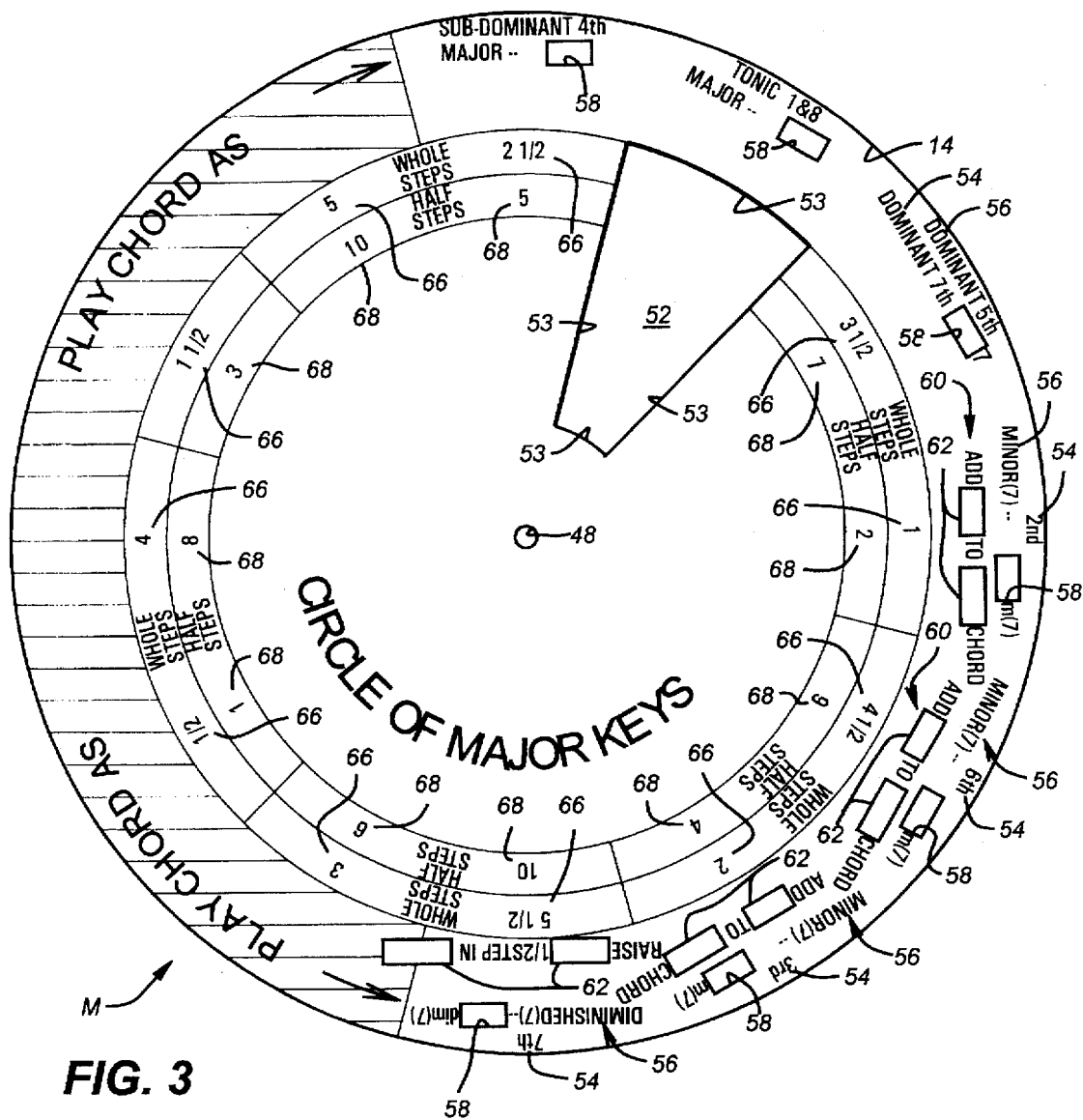
FIG. 3 is a plan view of a second or intermediate disk member of the apparatus of FIG. 1.
Figure 4:
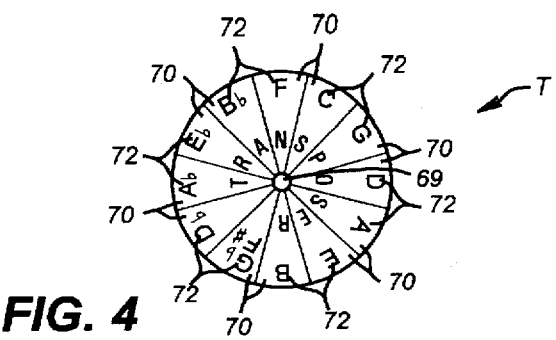
FIG. 4 is a plan view of a third or outer disk member of the apparatus of FIG. 1.

In the drawings, the letter A (FIG. 1) designates generally an apparatus according to the present invention for music education and training purposes. The apparatus A includes a base member or template B (FIGS. 2A and 2B), a second or intermediate disk member or template M (FIG. 3) and a third plate or disk member T (FIG. 4). Each of the base member B, intermediate disk member M, and third plate member T are formed of a relatively stiff plastic, paper, cardboard or other material of suitable strength and durability.

Each of the members B, M, and T of the apparatus A are concentrically rotatably mounted with respect to each other at a central hub or pin 10. The central hub 10 may be a brad, stud or other rotatable connector mechanism which functions as a pivot point about which the three component members of the apparatus A may be rotatably moved. As will be set forth, the members M and T are movable to various positions of radial alignment with the base member B to assist a user in learning and understanding the relation between various keys on a musical instrument. In the embodiment shown, the apparatus A is illustrative of the relation between the various musical keys according to the circle of fifths concept on a piano. It should be understood, however, that the present invention can be used with other musical scales, relationships and for different instruments as well.

The base member B is slightly larger in surface area than the second member M, but underlies the second disk member M. Thus, an outer rim or border portion 12 of the base member B is visible beyond an outer rim or edge 14 of the second disk member M. The base member B is shown in FIGS. 2A and 2B in somewhat larger size than in FIG. 1 in order that the contents of its various areas of segments to be discussed below may be more easily seen in the drawings.

For the diatonic scale, and according to the circle of fifths relationship, the outer rim 12 of the base member B is divided into twelve equal arcuate musical key segments 16, each of which has a different musical key indicator 18 thereon designating each of the fifteen musical keys used in modern music, namely: C, G, D, A, E, B (or C♭), G♯ (or F♯), D♭ (or C♯), A♭, E♭, B♭, and F, respectively. Usually, separator borders or indicators 19 are formed on the base member 12 between each of the arcuate musical key segments 16, as indicated. Also, included in the musical key segments 16 (below the musical key symbols) are smaller letters as indicated at 21 indicating the alternative name of the note shown above.

Additionally, an outer lip or edge 20 forms a flat surface at the outer portion of the outer rim 12 of the base member B for each of the musical key segments 16. This flat surface 20 permits the apparatus A to be stably positioned on any one of twelve key segment edges for ease of viewing, such as in the music holder of a piano, if desired. The musical key indicators 18 are preferably located on base member B so that the topmost indicator appears in an upright position.

The base member B also includes on its inwardly extending portion (FIGS. 2A and 2B) of each of the musical key segments 16 an indicator area 22 where other indicators are placed or formed. These indicators include a key indicator area 24 which designates the musical key of music key indicator 18 and indicates how that key appears on written or sheet music. The notation or indicator in each of the key indicator areas 24 corresponds to the musical key indicator 18 for that particular musical key segment 16, and is selectively visible through the second member M in a manner to be set forth.

A key signature indicator 28 is formed in each of the musical key segments 16 and contains the key signature for the particular music key of that musical key segment as it would appear in written music. The indicator area 22 for each musical key segment 16 also includes an indicator area 30 for receiving indicators of whether or not any sharps or flats are present in the key designated by the music key indicator 18, and, if so, the number of each such sharps or flats. Further, an area or segment 32 of the base member B also bears indicators of which particular notes in the key designated by indicators in the area 30 are sharp or flat in the key designated by the music key indicator 18.

Chart I illustrates the number of sharps and flats in each of the various keys, as well as which notes are either sharp or flat, for each of the fifteen musical keys of musical key segment 16 on the base member B:

CHART I

| Key Indicator 16 | Indicators 30 and 32 Number of Sharps and Flats |
| --- | --- |
| C | None |
| G | One Sharp (F♯) |
| D | Two Sharps (F♯, C♯) |
| A | Three Sharps (F♯, C♯, G♯) |
| E | Four Sharps (F♯, C♯, G♯, D♯) |
| B | Five Sharps (F♯, C♯, G♯, D♯, A♯) |
| C♭ | Seven Flats (B♭, E♭, A♭, D♭, G♭, C♭, F♭) |
| G♭ | Six Flats (B♭, E♭, A♭, D♭, G♭, C♭) |
| F♯ | Six Sharps (F♯, C♯, G♯, D♯, A♯, E♯) |
| D♭ | Five Flats (B♭, E♭, A♭, D♭, G♭) |
| C♯ | Seven Sharps (F♯, C♯, G♯, D♯, A♯, E♯, B♯) |
| A♭ | Four Flats (B♭, E♭, A♭, D♭) |
| E♭ | Three Flats (B♭, E♭, A♭) |
| B♭ | Two Flats (B♭, E♭) |
| F | One Flat (B♭) |

Where dual names are shown in Chart I, the user should read the flat (♭) name if in a key with flats (♭'s) in the key signature, and should read the sharp (♯) name if in a key with sharps (♯'s) in the key signature. The one exception is in the key off where the 7th note is to be read as E, not F♭. This same principle applies to Charts II and III.

Additionally, the base member B has for each of the musical key segments 16 an indicator area or segment 34 which has an indicator 36 of a chord, and also at a spaced location an indicator 38 of a note to be added to the chord indicated at area 36 to form a particular chord of interest for harmony. The indicators 36 and 38 are also selectively visible through the second member M in a manner to be set forth. Chart II illustrates the indicators 36 of different chords and the indicators 38 of notes to be added for each of the fifteen musical key segments 16 on the base member B:

CHART II

| Key Indicator 16 | Chord Indicator 36 | Note to be Added Indicator 38 |
| --- | --- | --- |
| C/B♯ | C/B♯ | E♭ |
| G | G | B♭ |
| D | D | F |
| A | A | C |
| E/F♭ | E/F♭ | G |
| B/C♭ | B/C♭ | D |
| G♭/F♯ | G♭/F♯ | A |
| D♭/C♯ | D♭/C♯ | E |
| A♭/G♯ | A♭/G♯ | B |
| E♭/D♯ | E♭/D♯ | G♭/F♯ |
| B♭/A♯ | B♭/A♯ | D♭/C♯ |
| F/E♯ | F/E♯ | A♭/G♯ |

Finally, the base member B has for each musical key segment 16 a Raise Step indicator area or segment 40 formed thereon. The indicator 40 serves to indicate a note to be raised one-half step. An indicator 42 is formed on each key segment 16 at a spaced location from indicator 40 to designate a dominant 7th chord. The indicator 42 designates the chord in which the note indicated at area 40 is to be raised. Chart III illustrates the indicators 40 of notes to be raised one-half step, and the indicators 42 of the dominant 7th chord for each of the fifteen musical key segments 16 on the base member B:

CHART III

| Key Indicator 16 | Raise Step Indicator 36 | Dominant 7th Chord Indicator 42 |
|---|---|---|
| C | A♭/G♯ | A♭7/G♯7 |
| G | E♭ | E♭7 |
| D | B♭ | B♭7 |
| A | F | F7 |
| E/F♭ | C | C7 |
| B/C♭ | G | G7 |
| G♭/F♯ | D | D7 |
| D♭/C♯ | A | A7 |
| A♭/G♯ | E | E7 |
| E♭/D♯ | B | B7 |
| B♭/A♯ | G♭/F♯ | G♭7/F♯7 |
| F/E♯ | D♭/C♯ | D♭7/C♯7 |

The second or intermediate member M (FIGS. 1 and 3) is preferably formed of a similar material to the base member B and is generally circular in form, extending radially inwardly from the circular outer edge 14 to a central opening or port 48 for the central hub 10. An alignment indicator 50 is formed on the second member M adjacent the outer edge 14 for selective alignment with various individual ones of the key indicators 18 on the base member B. The alignment indicator 50 also functions as a tonic indicator, bearing a notation TONIC 1 & 8, since the musical key with which the alignment indicator 50 is aligned functions in that situation as the first note on the diatonic key scale.

The intermediate member M also includes a viewing window or opening 52 formed inwardly of the alignment indicator 50 and defined as a sector within a border or edge 53. The viewing window 52 is of comparable size to the surface area of one of the musical key segments 16. This permits viewing of the contents of the indicator area 22 for a particular music key segment 16 when the alignment indicator 50 is aligned with the key indicator 18 for a particular music key. A user of the apparatus A can (FIG. 1) thus observe through opening 48 of the indicator area 30 and key signature indicator 28 for the particular key designated by the key indicator 18.

The intermediate member M has at circumferentially spaced positions adjacent the outer edge 14 at a comparable radial distance as the alignment indicator 50 a group of indicators 54, for each of the other notes in a particular key with respect to the tonic or alignment indicator 50. The indicators 54 are formed at locations corresponding to the locations of the particular notes on the musical scale with respect to the tonic note. The sequence or order of the indicators 54, including that of the tonic indicator 50 is in the following order about the periphery of the intermediate member M adjacent the outer edge 14: Sub-Dominant 4th, Tonic 1 & 8, Dominant 5th, 2nd, 6th, 3rd, 7th, as can be seen from FIGS. 1 and 3. Those portions of the surface area of the base member B circumferentially spaced from the indicators 54 as indicated at 55 are typically shaded to indicate that notes in those portions of the musical note spectrum or circle of fifths are not in that particular selected key aligned with the alignment indicator 50.

Radially inwardly on the intermediate member M from the indicators 54 are a number of Play Chord As indicators 56. The Play Chord Indicators 56 indicate the proper chords to play with the melody when the melody is in the key designated as tonic in order to achieve a pleasant harmony. Adjacent each of the Play Chord As Indicators 56 is an opening or port 58 permitting viewing of portions of the base member B. When the alignment indicator 50 is aligned with a musical key segment 16, the openings or ports 58 permit viewing of corresponding key indicator area 24 of the base member B. Chart IV below illustrates the relation between the indicators 54 and the Play Chord As indicators 56:

CHART IV

| Indicator 54 | Play Chord As Indicator 56 |
|---|---|
| Sub-Dominant 4th | Major |
| Tonic 1 & 8 | Major |
| Dominant 5th | Dominant 7th |
| 2nd | Minor (7) m (7) |
| 6th | Minor (7) m (7) |
| 3rd | Minor (7) m (7) |
| 7th | diminished (7) dim (7) |

A set of indicators 60 designating the adding of chords or half-step raises are located inwardly from certain of the Play Chord As indicators 56. Included as a part of each of the indicators 60 are a set of spaced viewing ports or openings 62. The ports 62 permit viewing of selected portions of either: (a) Different Chord Indicators 36 and Note to Be Added indicators 38 of the base member B; or (b) Raised One-Half Step indicators 40 and Dominant 7th indicators 42 of the base member B. The openings 62 are alignable over the Raise Step Indicator segment 40 and Dominant 7th indicator 42, or the Different Chord indicator 36 and Note to Be Added indicator 36 as the case may be, depending upon the alignment of the alignment indicator 50 with a particular music key indicator 18 on the base member B. Chart 5 below illustrates the relation between the indicators 54 and the indicator 60 on the intermediate member M.

CHART V

| Indicator 54 | Indicator 60 |
|---|---|
| 2nd | Add to Chord |
| 6th | Add to Chord |
| 3rd | Add to Chord |
| 7th | Raise ½ Step In |

A set of Whole Step indicators 66 are mounted inwardly on the intermediate member M from the indicators 60. The Whole Step indicators 66 specify in integers the number of whole steps for each of the other eleven intervals on the chromatic scale from the note aligned with tonic indicator 50. Thus, a user can view and ascertain the number of music steps from the tonic music key aligned at any time with the alignment indicator 50 to each of the other eleven music key segments 16 on the base member B.

A set of Half-Step indicators 68 are also mounted inwardly on the intermediate member M from the indicators 60. The Half-Step indicators 68 specify in integers the number of half-steps for each of the other eleven steps on the chromatic scale from the note aligned with tonic indicator 50.

Chart VI below indicates the relation between the indicator 54 and the Number of Steps indicators 66 and 68:

CHART VI

| Indicator 54 | Number of Whole Steps Indicator 66 | Number of Half Steps Indicator 68 |
|---|---|---|
| Tonic | — | — |
| Dominant 5th | 3-½ | 7 |
| 2nd | 1 | 2 |

CHART VI-continued

| Indicator 54 | Number of Whole Steps Indicator 66 | Number of Half Steps Indicator 68 |
| --- | --- | --- |
| 6th | 4-½ | 9 |
| 3rd | 2 | 4 |
| 7th | 5-½ | 11 |
| — | 3 | 6 |
| — | ½ | 1 |
| — | 4 | 8 |
| — | 1-½ | 3 |
| — | 5 | 10 |
| Sub Dominant 4th | 2-½ | 5 |

It is also desirable in certain circumstances to illustrate a special relationship between various notes. For this purpose, suitable specific colors or other indicia such as cross-hatching, shading or other distinctive markings are formed on the intermediate member M illustrating this relationship. Thus, the relation between the Sub-Dominant 4th and 2nd notes in the scale is indicated by common marking or other indicator; the relation between the Tonic 1 & 8 note and the 6th note is indicated by another distinctive marking or code; while the relationship between the Dominant 5th and each of the 3rd and 7th notes is indicated by common indicator shading or cross-hatching as desired.

The third plate or disk member T is a smaller circular disk or plate member, also of a similar material to the base member B and intermediate member M. The third member T is concentrically rotatably mounted at an opening 69 (FIG. 4) to receive the central hub 10 with each of the base member B and intermediate member M. The third plate member T is divided into twelve equal arcuate musical key segments 70, each of which has a different music key indicator 72 therein designating each of the fifteen music keys used in modern music. The key indicators 72 are comparable in number to and identical to those of the different music key indicators 18 on the base member B, namely: C, G, D, A, E, B (or C♭), G♭ (or F♯), D♭ (or C♯), A♭, E♭, B♭, and F, respectively. The third member T thus represents the circle of fifths relationship and can be rotated to be aligned with the same notes as the music key indicators 18 to function as a ready sight reference for alignment with the base member B. Additionally, by aligning a particular one of the music key indicators 72 on the third member T with a different key music key indicator 18 on the base member B, a ready reference for transposing of musical keys can be obtained.

Figure 1:
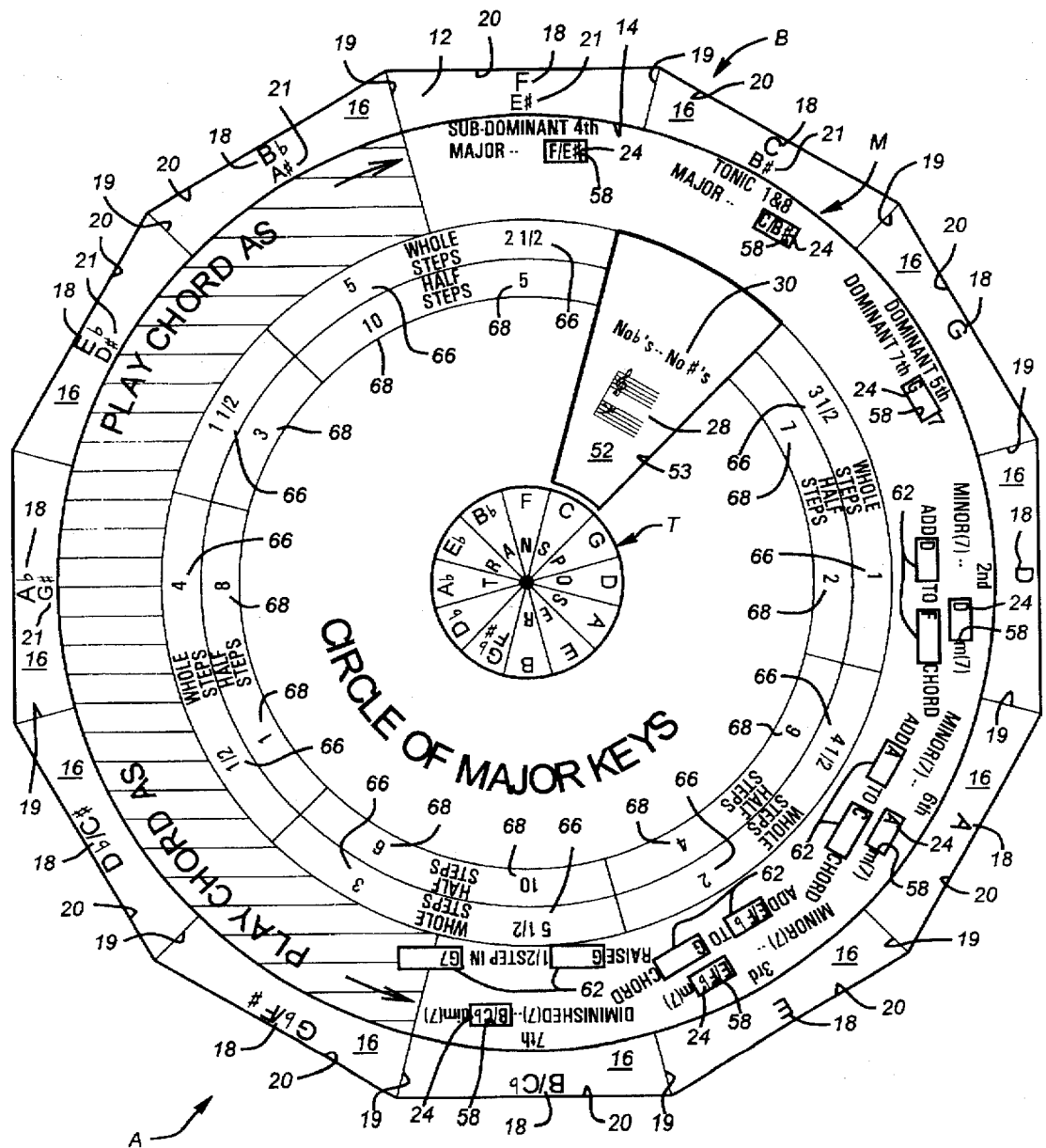
FIG. 1 is a plan view of an apparatus according to the present invention.

In the operation of the present invention, to play and learn the key of C Major, the intermediate member M is rotated so that the window 52 is open at the C position of key indicator 18 for C (FIG. 1). The alignment indicator 50 immediately below key indicator 18 for the key of C indicates the proper position for the key of C as the base. In this position, the window 52 shows the key signature 28 that any piece of music has when the music is in the key of C Major.

The intermediate template M also shows the position of the seven notes in the key of C Major. For example, the notes go from F just to the left of C around to the right of C, from G through B. The notes are all numbered by the indicators 54, with F being the 4th note in C and B being the 7th. As the template M is rotated to another root or tonic position, the seven notes in any other key are automatically lined up. Thus, a musician can easily move from one key to another. This is especially helpful in transposing a song from one key to another.

The "Play Chord As" indicators 56 indicate the proper chord to play with the melody for a pleasing harmony. For example, when playing in the key of C the 4th note is F and as indicated F is best played as a Major chord. Likewise, G is best played as a Dominant 7th chord in the key of C. In this way each note is marked by indicators 56 for its best chord use. The windows or openings 58 formed along this portion of member M show indicators 24 to the user to indicate what the chord would look like when written on sheet music. For example, when playing in the key of C Major, the note D would be used in a D Minor 7th chord and would be shown as Dm7 (FIG. 1). Also, as shown, this chord is formed by the simple addition of the note D to an F major chord.

A logical starting point for a student to learn to play a song is by using just three chords: the chord of the base note (in the case of FIG. 1, C), and chords of the note just to the left of base (F) and the note just to the right of base (G). As shown the C and F chords would be played as Major triads while G would be played as the dominant 7th chord.

To enhance the sound once this initial learning step has been accomplished, colors or other designators are present, as described above, to indicate the steps to take. As an example, specific colors may be used to indicate a special relationship between two notes in a particular key. For example, F (the 4th in the key of C) and D (the 2nd) may both colored similarly, such as blue. As indicated by the openings 62, a user need simply add the note D to the Major chord F to get the chord D minor 7th (Dm7). This new chord enhances the sound when used in place of an F chord for songs in the key of C. Similarly, C (the tonic) and A (the 6th) are colored orange to show as indicated at openings 62 that the chord C can be enhanced to an A Minor 7th (Am7) chord by simply adding A to the C chord. Also, G (the dominant 5th) is related to both E (the 3rd) and B (the 7th). As shown at indicator windows 62, an E Minor 7th (Em7) chord comes from adding E to a G chord and can be used as a substitute for the G dominant chord. B is best used in a diminished 7th chord in the key of C and the indicators 62 indicates that a B diminished 7th (Bdim7)chord is obtained by simply raising the G note in a G dominant 7th (G7) chord to G♯ (A♭).

When it is desirable to study or practice similar relations for other chords, the alignment indicator 50 is rotated into alignment with a new and different key indicator 18. In this position, the structure of the apparatus allows display of the various musical relationships discussed above for the various keys, chords and the like in the new key. The various relationships are easily determined and easy to learn.

Having described the invention above, various modifications of the techniques, procedures, material and equipment will be apparent to those in the art. It is intended that all such variations within the scope and spirit of the appended claims be embraced thereby.

I claim:

1. An apparatus for music education and training comprising:
    a base member having musical key segments formed thereon assigned to each of several musical keys, each of said musical key segments being arranged on said base member according to the circle of fifths relationship, each of said musical key segments further having an indicator area having indicators thereon, defining for the assigned musical key:
        a key indicator designating that musical key;
        a key signature for that key in written music;
    said base member having an additional indicator segment formed thereon having an indicator of a different chord and also at a spaced location therefrom an indicator of a note to be added to said different chord to form a particular chord of interest:

a second member movably mounted with respect to said base member and having formed thereon an alignment indicator for selective alignment with each of said key indicators of said musical key segments;

said second member further having formed therein a viewing window of similar size to one of said musical key segments to permit viewing of the indicator area for one of said musical key segments when said alignment indicator is aligned with said key indicator for that key; and said second member having a pair of openings formed therein spaced from said viewing window and alignable over said different chord indicator and said note to be added indicator for viewing such portions of said additional indicator segment.

2. The apparatus of claim 1, wherein:

said second member has a viewing port formed therein spaced from said viewing window selectively alignable over said key signature indicator of said base member.

3. The apparatus of claim 1, wherein:

said base member has a raise step indicator segment formed thereon to indicate a note to be raised one-half step and also at a spaced location therefrom a dominant 7th chord indicator to indicate the chord in which such note is to be raised.

4. The apparatus of claim 1, wherein:

said second member has segments for various keys formed thereon like in number to the number of musical key segments on said base member.

5. The apparatus of claim 1, wherein:

said second member has formed thereon a tonic indicator of the tonic note in a particular key formed adjacent said alignment indicator.

6. The apparatus of claim 5, wherein:

said second member has formed thereon an indicator of the number of each of the other notes in a particular key formed at locations with respect to said tonic indicator corresponding to the locations of such notes on the musical scale with respect to the tonic in that key.

7. The apparatus of claim 1, further including:

a third member movably mounted with respect to said base member and said third member and having a like number of musical key segments to those on said base member.

8. The apparatus of claim 1, wherein:

said base member and said second member are rotatably mounted concentrically with respect to each other.

9. The apparatus of claim 8, wherein:

each of said base member and said second member are disk members.

10. The apparatus of claim 9, wherein:

said base disk member has flat outer edge segments formed thereon.

11. The apparatus of claim 1, wherein:

said indicator areas for said musical key segments also has formed thereon indicators of the number of sharps and flats in that key.

12. An apparatus for music education and training comprising:

a base member having musical key segments formed thereon assigned to each of several musical keys, each of said musical key segments having an indicator area having indicators thereon defining for the assigned musical key:

a key indicator designating that musical key;

a key signature for that key in written music;

a second member movably mounted with respect to said base member and having formed thereon an alignment indicator for selective alignment with each of said key indicators of said musical key segments;

said alignment indicator further having an indicator indicating a tonic note for a selected musical key on said base member when aligned therewith;

said base member further including a play chord as indicator visible through said second member to indicate a chord to play with the melody in the key designated by said alignment indicator;

said second member further having formed therein a viewing window of similar size to one of said musical key segments to permit viewing of the indicator area for one of said musical key segments when said alignment indicator is aligned with said key indicator for that key; and said second member having an opening spaced from said viewing window and alignable over said play chord as indicator for viewing the chord indicated thereby.

13. The apparatus of claim 12, wherein said second member has a first relationship indicator indicating a relationship between a first note, said first note having a first chord, and at least one additional note in a key designated by said alignment indicator, and further including:

said second member having a second relationship indicator wherein said second relationship indicator defines a second chord in terms of said first chord of said first note and said at least one additional note, wherein said second chord can be used in place of said first chord in a song in a key designated by said alignment indicator.

14. The apparatus of claim 12, wherein said musical key segments are arranged on said base member according to the circle of fifths relationship.

15. An apparatus for music education and training comprising:

a base member having musical key segments formed thereon assigned to each of several musical keys, each of said musical key segments being arranged on said base member according to the circle of fifths relationship, each of said musical key segments further having an indicator area having indicators thereon, defining for the assigned musical key:

a key indicator designating that musical key;

a key signature for that key in written music;

said base member having a raise step indicator segment formed thereon to indicate a note to be raised one-half step and also at a spaced location therefrom a dominant 7th chord indicator to indicate the chord in which such note is to be raised;

a second member movably mounted with respect to said base member and having formed thereon an alignment indicator for selective alignment with each of said key indicators of said musical key segments;

said second member further having formed therein a viewing window of similar size to one of said musical key segments to permit viewing of the indicator area for one of said musical key segments when said alignment indicator is aligned with said key indicator for that key; and said second member having a pair of openings formed therein alignable over said raise step indicator segment and said dominant 7th chord indicator for viewing such portions of said additional indicator segment.

16. An apparatus for music education and training comprising:
- a base member having musical key segments formed thereon assigned to each of several musical keys, each of said musical key segments being arranged on said base member according to the circle of fifths relationship, each of said musical key segments further having an indicator area having indicators thereon, defining for the assigned musical key:
  - a key indicator designating that musical key;
  - a key signature for that key in written music;
- a second member movably mounted with respect to said base member and having formed thereon an alignment indicator for selective alignment with each of said key indicators of said musical key segments;
- said second member further having formed therein a viewing window of similar size to one of said musical key segments to permit viewing of the indicator area for one of said musical key segments when said alignment indicator is aligned with said key indicator for that key;
- said second member having segments for various keys formed thereon like in number to the number of musical key segments on said base member; and
- said second member having indicators formed on said key segments thereof indicating the number of steps between each such key and the key aligned with said viewing window.

* * * * *